US007627867B2

(12) United States Patent  (10) Patent No.: US 7,627,867 B2
Banks  (45) Date of Patent: Dec. 1, 2009

(54) CHANGE MANAGEMENT OF INTERFACES IN DISTRIBUTED COMPUTER SYSTEMS

(75) Inventor: Timothy William Banks, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 1006 days.

(21) Appl. No.: 10/976,207

(22) Filed: Oct. 28, 2004

(65) Prior Publication Data

US 2005/0144591 A1    Jun. 30, 2005

(30) Foreign Application Priority Data

Dec. 30, 2003 (GB) ................... 0330161.1

(51) Int. Cl.
*G06F 9/44* (2006.01)
*G06F 15/16* (2006.01)
(52) U.S. Cl. .................. 717/170; 717/168; 709/203
(58) Field of Classification Search ......... 717/120–123, 717/168–173; 709/201–203
See application file for complete search history.

(56) References Cited

U.S. PATENT DOCUMENTS

| 5,005,122 | A | * | 4/1991 | Griffin et al. ................. 709/203 |
| 5,845,077 | A | * | 12/1998 | Fawcett ....................... 709/221 |
| 5,915,112 | A | | 6/1999 | Boutcher |
| 5,974,428 | A | * | 10/1999 | Gerard et al. ................ 707/203 |
| 5,991,536 | A | | 11/1999 | Brodsky et al. |
| 6,006,034 | A | | 12/1999 | Heath et al. |
| 6,170,013 | B1 | * | 1/2001 | Murata ......................... 709/229 |
| 6,272,521 | B1 | * | 8/2001 | Jablonski et al. ............. 709/200 |
| 6,415,435 | B1 | * | 7/2002 | McIntyre .................... 717/108 |
| 6,493,768 | B1 | * | 12/2002 | Boutcher ..................... 719/330 |
| 6,658,000 | B1 | * | 12/2003 | Raciborski et al. ........... 370/386 |
| 6,711,676 | B1 | * | 3/2004 | Zomaya et al. ............. 713/100 |
| 6,842,264 | B1 | * | 1/2005 | Leyva et al. ............... 358/1.15 |
| 7,055,147 | B2 | * | 5/2006 | Iterum et al. ................ 717/170 |
| 7,178,143 | B2 | * | 2/2007 | Pugh et al. .................. 717/170 |
| 7,305,669 | B2 | * | 12/2007 | Roush ........................ 717/170 |

FOREIGN PATENT DOCUMENTS

WO    WO 00/04456    1/2000

OTHER PUBLICATIONS

Jeffrey Kenyon, WebServices Journal, Web Service Versioning and Deprecation, vol. 3, issue 2, Feb. 2003; http://sys-con.com/magazine/?issueid=133&src=false.
WebServices Journal, Link to full article Jan. 21, 2003; http://sys-con.com/story/?storyid=39678&DE=1#RES.

* cited by examiner

*Primary Examiner*—Wei Y Zhen
*Assistant Examiner*—Qing Chen
(74) *Attorney, Agent, or Firm*—Stephen J. Walder, Jr.; David A. Mims, Jr.

(57) ABSTRACT

Mechanisms for change management of interfaces in a distributed computer system are provided in which there are multiple versions of an interface describing communication between distributed client and server applications. The mechanisms include providing an indication with a response to an operation of an interface that an alternative interface is available. The information can include: a time interval in which a client application must contact a server application using the version of the interface, a reference to a succeeding version of the interface; and/or an indication of an expiry date and time of an interface. The interface itself is used to communicate version and validity information and change to client applications.

11 Claims, 3 Drawing Sheets

CHANGE MANAGEMENT OF INTERFACES IN DISTRIBUTED COMPUTER SYSTEMS

FIELD OF THE INVENTION

This invention relates to the field of change management of interfaces in distributed computer systems. In particular, the invention relates to managing changes between multiple versions of client and server interfaces in distributed computer systems.

BACKGROUND TO THE INVENTION

Distributed computer systems have become more widespread as computer networks have developed. Distributed computer systems comprise multiple computer systems connected by one or more networks such that the resources of the computer systems can be shared. Processes instructed by a local computer system can be executed on a remote computer system. The connecting networks can include Local Area Networks (LANs), Wide Area Networks (WANs) and global networks such as the Internet.

One form of distributed architecture in which multiple computer processes may cooperatively perform tasks is under a "client-server" relationship. In such a relationship, a "client" or calling computer process issues or sends a request for a remote procedure to a "server" or receiving computer process which executes the procedure. It will be appreciated that whilst one computer process may function as a client which issues a procedure request and another may function as a server when it executes the procedure, any computer process may function as both a client and a server in different capacities. The terms "client" and "server" may also be applied to peer systems.

Requests are passed between application programs running on the client and server computer systems by communication described by an interface.

As new functionality is implemented in computer processes and environments, remote procedure interfaces often may be enhanced to support the new functionality. As is common practice with computer programs or applications, enhancements to an interface are embodied in a new version of the interface.

To support a new version of an interface, both the client and the server utilising the interface must support the new version. However, in many distributed computer systems it is impossible or impractical to upgrade all clients and servers at the same time to a new version of a remote procedure interface. This is particularly true in shared or public networks. Consequently, multiple versions of an interface may exist in a distributed computer system.

In existing systems, multiple interface versions are handled by allowing servers to support multiple versions, with clients usually supporting only single versions of an interface. Clients can access both old and new versions of an interface simultaneously for as long as the clients may need to access the old versions. This allows clients to test their use of a new interface while doing useful work with the old interface.

A problem that arises is that servers must maintain old interfaces and implementations and, probably multiple old levels, for long periods which will eventually make maintenance and functional progress costly or even impossible.

The problem stems from the fact that the server has no information which can reveal whether any client depends on the old interface because a client may not require the service for some unpredictable time. In an organisation where clients and servers are under a single management scope, it is possible to audit the software and enforce upgrades to new versions. However, in the context of public networks such as the Internet, such control is not possible and other means of communication and influence are needed.

The development of the Internet has resulted in the use of open or shared computing in which applications are freely and dynamically available to users via the Internet with no licence agreement to formalise any long-term relationship. Such systems result in further loss of control and influence over the version of interfaces used. Recent trends in the Internet are towards the use of 'Web Services' whereby standard functions, associated with a particular industry or infrastructure requirement, are established by a consortium of companies and thus represent a standard interface.

There are several approaches that are used in existing systems. Firstly, it is possible to provide an interface description which allows some flexibility in information content. One example is called the REST architecture described by R. T. Fielding which has few stable operations (such as a GET) on documents of arbitrary complexity. Another example is to provide extensible parameters available in some description languages such as XML. These approaches unavoidably provide imprecise information about the interface, including the ability to change content beyond the scope anticipated by the user. Therefore, they do not enable the description of and planning for changes.

A second approach is to accept that interfaces must be stable but, if new versions are found to be necessary, to broadcast information to all users and implementers of the interface. This method can be used where an application is part of a widely used infrastructure, such as the Domain Name Server (DNS) used in the Internet. RFC 921, published by the Internet Engineering Task Force (IETF) on their website, is an example of such a broadcast. Clearly the exploitation of such broadcasts must be limited to a small number of special cases if users are not to be swamped with information.

A third approach might be to provide a licensed program which exploits an interface available in a distributed system. The program can be distributed with a licence of limited lifetime, so providing information about the potential use of the facilities in the distributed system. This approach is not consistent with the requirement, characteristic of many technical standards in the Internet, to provide open interfaces which any client may freely implement.

A fourth approach is to continue to support old versions indefinitely as new versions are introduced. This approach constrains evolution of a service.

SUMMARY OF THE INVENTION

Accordingly, according to a first aspect the present invention provides a method in a distributed computing system to manage a change of interface to a service application from a first interface to a second interface, the first and second interface providing access to the service application, the method comprising: receiving a request from a client to perform an operation of the first interface; building a response to the request; and adding information to the response, the information comprising an indication that the second interface is available.

According to a second aspect the present invention provides a data processing system for managing a change of interface to a service application from a first interface to a second interface, the first and second interface providing access to the service application, the system comprising: means for receiving a request from a client to perform an operation of the first interface; means for building a response to the request; and means for adding information to the response, the information comprising an indication that the second interface is available.

According to a third aspect the present invention provides a computer program product comprising instructions which, when executed on a data processing host, cause said host to carry out a method according to the first aspect.

Optionally the information which comprises as indication that a second interface is available can comprise one or more of: a reference to the second interface which can be used to obtain access to the second interface; an indication of a time interval within which, if the client wishes to continue to use the first interface, the client should register the wish as a requirement; an indication of an expiry time which defines a time from which the service application will not be accessible using the first interface; and statistics which indicate the relative usage of the first and second interfaces by a set of clients which access the service application through those interfaces.

Preferably the operation is for specifically obtaining the information. Alternatively the information is passed in a context included in the response flow to the client.

For example, the first interface is an older interface, the second interface a newer interface, and the information is designed to encourage the client to start using the second interface in preference to the first interface.

BRIEF DESCRIPTION OF THE DRAWINGS

Embodiments of the present invention will now be described, by way of examples only, with reference to the accompanying drawings in which.

DETAILED DESCRIPTION OF THE PREFERRED EMBODIMENT

Figure 1:
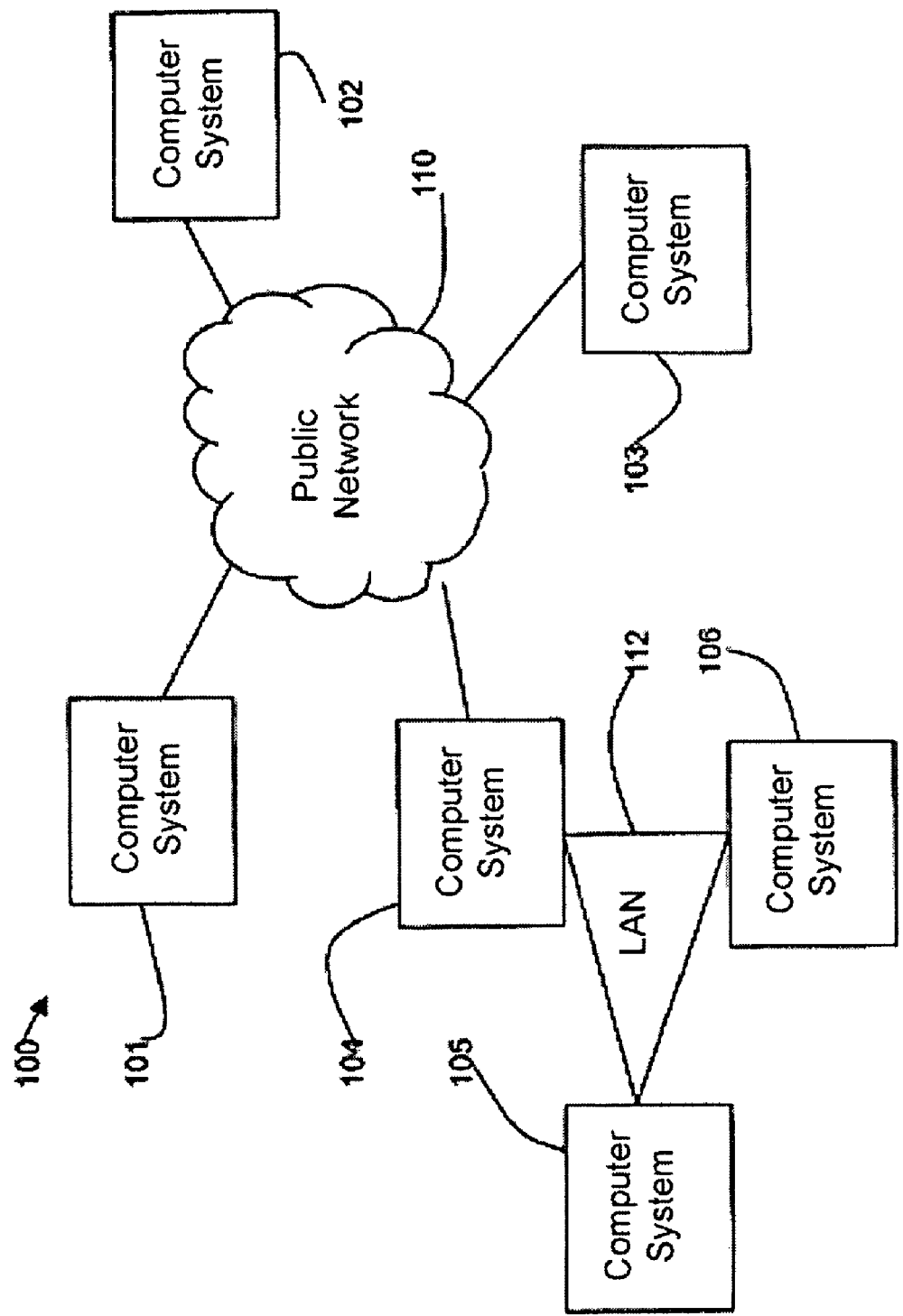
FIG. 1 is a schematic block diagram of an example configuration of a distributed computer system in accordance with the present invention.

Referring to the drawings, a distributed computer system 100 is described. FIG. 1 is an illustration of a distributed computer system 100 which provides an example of the possible configurations of such a system 100. The nature of a distributed computer system 100 means that there is an infinite number of possible arrangements or configurations.

In FIG. 1, four computer systems 101, 102, 103, 104 are shown which are interconnected by a public network 110 which may be, for example, the Internet. One of the computer systems 104 is also connected to two further computer systems 105, 106 by a local area network (LAN) 112.

Each computer system 101, 102, 103, 104, 105, 106 may function as a client, a server or both. Each computer system generally includes a central processing unit (CPU), a non-volatile program storage means such as read only memory (ROM), a workspace such as random access memory (RAM) and a mass storage means such as a hard disk.

It should also be appreciated that although this description refers to communication between computer systems functioning as a client and a server, it also includes communication between computer processes operating on the same multi-tasking computer or processing system.

Figure 2:
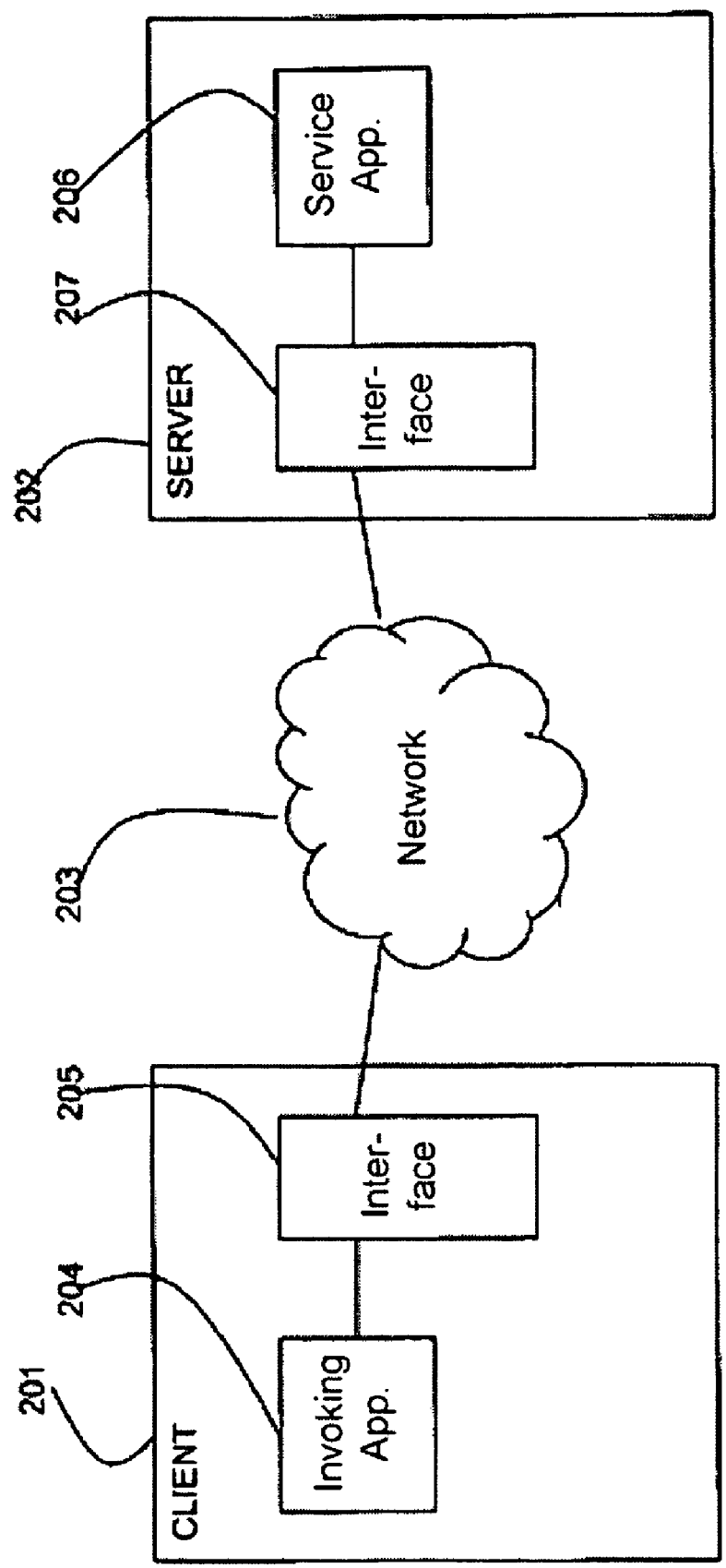
FIG. 2 is a schematic block diagram of a client and server of a distributed computer system in accordance with the present invention.

Referring to FIG. 2, a schematic representation of the software components of two distributed computer systems is shown in which one of the computer systems functions as a client 201 and one functions as a server 202. The client 201 and server 202 are connected via a network 203.

In distributed applications, the client 201 and server 202 engage in a relationship described by an interface that enables communication among distributed computer systems via a network 203. Through the interface, application programs distributed across a network can work together, communicating with each other and exchanging data to accomplish processing tasks. A sequence of communications between two application programs can accomplish one or more processing tasks.

The application programs include client applications which are also referred to as invoking applications which are resident on computer systems functioning as clients and which accomplish tasks for end users. The application programs also include service applications which are resident on computer systems functioning as servers and which provide services to other programs. Together the application programs distributed across one or more networks perform distributed processing.

FIG. 2 shows a client 201 with an invoking application 204 and an interface 205. The client is in communication with a server 202 by means of a network 203. The server 202 has a service application 206 and an interface 207.

A service is a procedure that can be invoked via a remote transmission of data, involving either a one-way message or a request and its corresponding reply.

An interface 205, 207 is a description of the operations and associated parameter types used to invoke a service. The description can be used by a human programmer, probably making use of programming tools, to create a service application 206 which implements the interface by providing support for the operations defined for the interface. The interface description represents a contract between an invoking application 204 and a target service application 206.

A service application executing on server 202 receives a request for an operation provided by the interface, acts on it, and produces a response. For example, the action could be to change and/or obtain stored information. Note that a given interface may be implemented by any number of different service applications each with different various characteristics, such as speed of execution or cost, which are independent of the interface description.

The described method could be usefully applied to any interface which can be implemented by a server application wishing to be dynamically selected without any enduring contractual relationship with a client. It is likely, therefore, to be useful where interfaces are open standards. It is most useful where an implementation must provide access to some facility, such as a database, which cannot be easily replicated to separate a new implementation and interface from its predecessor.

An example is the Universal Description, Discovery and Integration (UDDI) directories which are an important part of the emerging Internet technology known as 'Web Services'. UDDI has interface versions 1, 2, and 3. It is a matter for implementations of UDDI to consider which versions should be supported and support for all three is a reasonable decision given an unknown population of client systems. Each new version may place a burden of complexity on the implementation. Examples of such issues are described in section 10 ('Multi-Version Support') of the UDDI V3 specification.

As is demonstrated by UDDI, the server 202 may require corrections or desire improvements to the interface or its implementation and, in order to provide a reasonable quality of service to the client, these must be introduced without disrupting the client.

In this description, a change to the implementation is described as if it were a change to the interface; the semantics of the interface (exposed by the behaviour of the implementation) may change even though the interface syntax remains the same. For example one or more new operations may be provided and/or one or more existing operations may be removed or require different parameters, and/or the behaviour of existing operations could be changed.

In the described method each new version of an interface is identified by a unique identifier to make it clear to clients that a change has been made. The identifier can be, for example, a Universal Unique Identifier (UUID) or an extension to the interface name.

Figure 3:
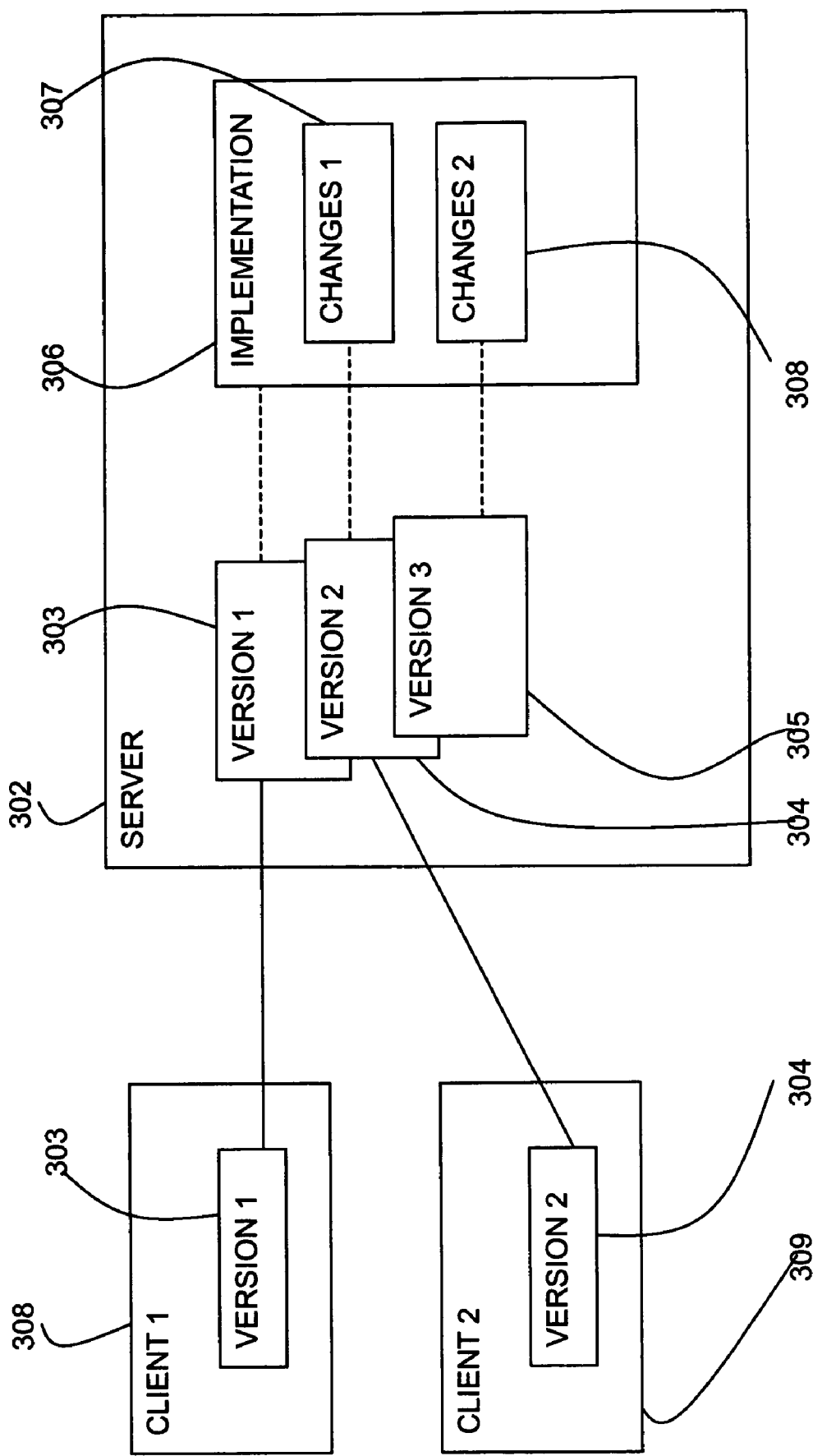
FIG. 3 is a schematic diagram of a server with multiple interface versions in accordance with the present invention.

As new versions of an interface are developed, a server may provide support, for example, for a service application which provides an implementation of several versions of the interface. Alternatively, for example, the server may provide support for multiple versions of the service application each providing an implementation of a different version of the interface. This enables a client to access the service application through whichever version of the interface is used by the invoking application of the client. This is illustrated in FIG. 3. A server 302 has a service application which provides an implementation of three versions of an interface 303, 304, 305 which correspond to the original implementation 306, and changes 307, 308 respectively. A first client 308 uses the first version 303 of the interface and a second client 309 uses a second version 304 of the interface.

The server 302 has published a most recent version of the interface, version 3 305, which it would like to influence the clients who are still using previous versions to use. Client 1 308 is still using the original version, version 1 303, of the interface which does not accommodate any changes to the implementation 306. Client 2 309 is using version 2 304 of the interface which includes a first set of changes 307 to the implementation 306. The most recent version of the interface, version 3 305, accommodates the first set of changes 307 and a second set of changes 308 to the implementation.

In the described method, each version of an interface includes one or more operations which can be used to obtain information which provides an indication that an alternative version of the interface is available. For example the information could relate to the version of the interface in use and other versions of the interface and accordingly the service application can inform a client that a subsequent version of an interface is available and further point to a subsequent version of the interface. In another embodiment, each version of an interface provides a specific operation from which such information can be obtained. In another embodiment, such information is provided as one or more parameters on one or more operations defined for the interface to perform some other function other than to specifically obtain the information. In yet another embodiment such information can be passed as part of a context included with a response to a request to perform an operation provided by the interface. A context is a data field which is flowed with a response but is not a parameter of the operation, and is often used by middleware. For example the application service builds a response to an operation and provides it to middleware for sending back to the client, the middleware then tags additional data, in the form of a context, to the response flow. Now, when such a flow arrives at the client it is received by middleware which removes and uses the context received with the flow and then provides the response to the invoking application.

Examples of information which could be provided by an interface as an indication that an alternative version of the interface is available are:
1. A time interval within which the client should next indicate a requirement to continue use of the interface.
2. A reference to a later version to the interface, if there is one.
3. A date/time when the interface will no longer be supported.
4. Statistics which indicate the usage by clients of the interface compared with a different version.

If a time interval within which the client should next indicate a requirement to continue use of the interface is provided, this requirement could be indicated, for example, by simply using the service, or by registering with the provider of the service application a continued interest in the interface version being used by the client. If the client does not indicate this requirement within the time period, the server can assume that the client is no longer interested in this version of the interface when deciding whether to withdraw the version of the interface. For example, the time interval provided could change over time, for example the interval provides could be reduced over time as the desire to remove support for the interface increases.

If a reference to a later version of the interface is provided the presence of this reference, for example, implicitly informs the client that later interface is available and use of the current interface is no longer recommended. The reference could be, for example, be a URL or a TCP/IP address from which details of the later interface can be obtained. Alternatively the reference could provide sufficient details to request an operation of the later version of the interface, for example by including details of one or more operations and network addresses at which those operations can be requested.

If an expiry time is provided this indicates when the current interface will no longer be supported and provides an advanced warning to a client still using a superseded version of an interface that the version will be discontinued. For example the expiry time could be a date and time or a time duration. The client should update to the most recent version of the interface in good time before the expiry time thereby allowing an overlap time for the client to use both versions of an interface in order to overcome any initial problems the client may experience with the new version of the interface. If such information is provided but the expiry time has not yet been decided such date and time information is not included.

If statistics are provided these can be used, for example, to indicate to a client the usage of the interface compared with other versions of the interface by the set of clients which use the service application. The statistics might include the current rate of requests to the current interface and a succeeding interface and details of the rate at which these rates are changing. For example the statistics could indicate the percentage of the requests, or the number of requests, made to each interface over a given time period, or an average of the number of requests received for a plurality of intervals in a given time period. For example, the statistics can further provide multiple copies of the statistics for different time periods and details of changes of the statistics over different time periods. The object of the statistics is to encourage uptake of an improved version of the interface and to justify the withdrawal of an old version based on usage. For example if a client discovers that, over the previous week, only 1% of clients are using the same interface as it and 99% of clients are using a later interface, it will be encouraged to move as this will be seen as an indication, for example, that the interface will soon be withdrawn or that the later interface is better.

In the preferred embodiment, it is the responsibility of each client to obtain the information, even if this is only to query the statistics, periodically in order to register its interest and to use the statistics to plan for any appropriate upgrades.

In the preferred embodiment it is the responsibility of the service application provider to set the time for withdrawal of a version of an interface, preferably reasonably. The timing may depend on (among other factors) the registration interval, the history and expectations of the clients, the rate of take-up of the new version of the interface, its use within larger components and the lifespan of those components.

Referring again to FIG. 3, client 1 308 is using a superseded version of the interface in the form of version 1 303. Version 1 303 of the interface includes an operation which provides various indications that an alternative version of the interface is available. Version 1 303 provides a time interval within which client 1 308 should indicate a requirement to continue use of the version 1 303 of the interface, by use of that interface. As client 1 is the only user of version 1 303 of the interface, if it does not use the interface within this time limit the interface will be withdrawn. Version 1 303 of the interface also provides a reference to version 3 305 of the interface which is the most up to date version of the interface supported by the server 302. Version 1 303 of the interface also provides an expiry date and time when support for the interface will be withdrawn. Version 1 303 of the interface also provides statistics indicating to client 1 308 the rate of requests to Version 1 303 and Version 3 305 of the interface.

Client 1 308 should realise, from the information provided in version 1 303 of the interface, that it should upgrade to the newer version of the interface and should take action in good time before the expiry date and time.

Client 2 309 is using a superseded version of the interface in the form of version 2 304. Version 2 304 of the interface includes an operation which provides the same indications as Version 1 that an alternative version of the interface is available, although the values of indications are different and the expiry time is not set, as this is not yet planned.

Client 2 309, should realise from the information provided in version 2 304 of the interface that he could upgrade to the newer version of the interface but does not need to take action immediately as there is no expiry date and time as yet.

The following is a specific example of an XML document which describes the format of a Web Services interface which could be used in combination with another, more specific, service interface, to collect information from clients about their use of the combined interface and to provide the clients with information which indicates that the combined interface is to be replaced.

```
<?xml version="1.0" encoding="UTF-8"?>
<definitions
    name="VersionInformation_v1"
    targetNamespace="http://Migration/"
    xmlns="http://schemas.xmlsoap.org/wsdl/"
    xmlns:tns="http://Migration/"
    xmlns:xsd="http://www.w3.org/2001/XMLSchema"
    xmlns:uddi="urn:uddi-org:api_v3">
    <types>
        <xsd:schema
            attributeFormDefault="qualified"
            elementFormDefault="qualified"
            targetNamespace="http://Migration/"
            xmlns="http://schemas.xmlsoap.org/wsdl/"
            xmlns:tns="http://Migration/"
            xmlns:xsd="http://www.w3.org/2001/XMLSchema">
            <xsd:complexType name="VersionInformation">
```

-continued

```
                <xsd:sequence>
                    <xsd:element name="ContactInterval"
                        type="xsd:duration"/>
                    <xsd:element name="NewVersion"
                        nillable="true"
                        type="uddi:discoveryURL"/>
                    <xsd:element name="NotValidAfter"
                        nillable="true" type="xsd:dateTime"/>
                    <xsd:element name="PercentMigrated"
                        type="complete tns:percent"/>
                </xsd:sequence>
            </xsd:complexType>
            <xsd:simpleType name="percent">
                <xsd:restriction base="float">
                    <xsd:minInclusive value="0."/>
                    <xsd:maxInclusive value="100.0"/>
                </xsd:restriction>
            </xsd:simpleType>
        </xsd:schema>
    </types>
    <message name="getInformationRequest"> </message>
    <message name="getInformationResponse">
        <part name="result" type="tns:VersionInformation"/>
    </message>
    <portType name="VersionInformation_V1 ">
        <operation name="getInformation">
            <input message="tns:getInformationRequest"
                name="getInformationRequest"/>
            <output message="tns:getInformationResponse"
                name="getInformationResponse"/>
        </operation>
    </portType>
</definitions>
```

The operations of the interface provide for a flow of information between clients and servers and allow reasonable rules to be established as part of the implied contract for use of the interface for them to migrate from one version to another without disruption.

The solution addresses the issue of establishing reasonable expectations for clients in an unmanaged network influencing them to upgrade to use more recent levels of an interface/implementation and establishing when an old level of the interface can be withdrawn by the server.

The present invention is typically implemented as a computer program product, comprising a set of program instructions for controlling a computer or similar device. These instructions can be supplied preloaded into a system or recorded on a storage medium such as a CD-ROM, or made available for downloading over a network such as the Internet or a mobile telephone network.

Improvements and modifications can be made to the foregoing without departing from the scope of the present invention.

The invention claimed is:

1. A method of change management of interfaces in a distributed computer system, in which there are multiple versions of an interface describing communication between distributed client and server applications, the method comprising:

providing, in a server hosting a server application, an identifier for each version of an interface;

providing, in the server, a time interval in each version of an interface in which a client application must contact a server application using a version of the interface associated with the time interval to indicate a requirement to continue use of the associated version of the interface, otherwise support for the associated version of the interface will be withdrawn by the server application in response to expiration of the time interval;

in each superseded version of an interface, providing, in the server, a reference to a succeeding version of the interface, wherein the interface itself is used to communicate change to client applications;

receiving a request, targeting the server application, from a first version of the interface present on a client computing system;

determining, by the server, whether the first version of the interface has been superseded by a second version of the interface supported by the server;

transmitting a response to the request, to the client computing system, indicating that the first version of the interface has been superseded by the second version of the interface, in response to a determination that the first version of the interface has been superseded by the second version of the interface, wherein the response includes an indication of the time interval associated with the first version of the interface;

providing, in the server, an indication of an expiry date and time in association with the first version of the interface; and transmitting the expiry date and time in the response to the request to the client computing system.

2. A method as claimed in claim 1, wherein the method further comprises:

providing statistics in each version of the interface indicating the usage of one or more superseding versions of the interface by client applications; and transmitting statistics associated with the second version of the interface in the response to the request to the client computing system.

3. A method as claimed in claim 1, wherein the contact a client application must make to a server application within the time interval is a request from the client application, a registration of the client application's continued interest in the version of the interface, or a query to the statistics of the usage of the version of the interface.

4. A method as claimed in claim 1, wherein the reference to a succeeding version of the interface is a reference to the most up to date version of the interface.

5. A method as claimed in claim 2, wherein the statistics include the current rate of requests to different versions of the interface.

6. A distributed computer system, in which there are multiple versions of an interface describing communication between distributed client and server applications, the distributed computer system comprising:

a server that hosts a server application; and a client computing device coupled to the server via one or more data networks, wherein:

an identifier for each version of an interface is provided in the server;

a time interval in each version of an interface is provided in the server in which a client application must contact a server application using a version of the interface associated with the time interval to indicate a requirement to continue use of the associated version of the interface, otherwise support for the associated version of the interface will be withdrawn by the server application in response to expiration of the time interval;

in each superseded version of an interface, a reference to a succeeding version of the interface is provided in the server;

the interface itself is used to communicate change to client applications;

receiving a request, targeting the server application, from a first version of the interface present on a client computing system;

determining, by the server, whether the first version of the interface has been superseded by a second version of the interface supported by the server;

transmitting a response to the request, to the client computing system, indicating that the first version of the interface has been superseded by the second version of the interface, in response to a determination that the first version of the interface has been superseded by the second version of the interface, wherein the response includes an indication of the time interval associated with the first version of the interface; and an indication of an expiry date and time is provided in the server in association with the first version of the interface, and wherein the expiry date and time are transmitted in the response to the request to the client computing system.

7. A distributed computer system as claimed in claim 6, wherein each version of the interface includes statistics indicating the usage of one or more superseding versions of the interface by client applications; and wherein the statistics associated with the second version of the interface are transmitted in the response to the request to the client computing system.

8. A distributed computer system as claimed in claim 6, wherein the contact a client application must make to a server application within the time interval is a request from the client application, a registration of the client application's continued interest in the version of the interface, or a query to the statistics of the usage of the version of the interface.

9. A distributed computer system as claimed in claim 7, wherein the reference to a succeeding version of the interface is a reference to the most up to date version of the interface.

10. A distributed computer system as claimed in claim 7, wherein the statistics include the current rate of requests to different versions of the interface.

11. A computer program product stored on a computer readable storage medium for change management of interfaces in a distributed computer system, in which there are multiple versions of an interface describing communication between distributed client and server applications, comprising computer readable storage code means for:

providing, in a server hosting a server application, an identifier for each version of an interface;

providing, in the server, a time interval in each version of an interface in which a client application must contact a server application using a version of the interface associated with the time interval to indicate a requirement to continue use of the associated version of the interface, otherwise support for the associated version of the interface will be withdrawn by the server application in response to expiration of the time interval;

in each superseded version of an interface, providing, in the server, a reference to a succeeding version of the interface, wherein the interface itself is used to communicate change to client applications;

receiving a request, targeting the server application, from a first version of the interface present on a client computing system;

determining, by the server, whether the first version of the interface has been superseded by a second version of the interface supported by the server;

transmitting a response to the request, to the client computing system, indicating that the first version of the interface has been superseded by the second version of the interface, in response to a determination that the first version of the interface has been superseded by the second version of the interface, wherein the response includes an indication of the time interval associated with the first version of the interface;

providing, in the server, an indication of an expiry date and time in association with the first version of the interface; and transmitting the expiry date and time in the response to the request to the client computing system.

* * * * *

UNITED STATES PATENT AND TRADEMARK OFFICE
CERTIFICATE OF CORRECTION

PATENT NO.       : 7,627,867 B2
APPLICATION NO.  : 10/976207
DATED            : December 1, 2009
INVENTOR(S)      : Timothy William Banks It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1430 days.

Signed and Sealed this

Second Day of November, 2010

David J. Kappos
*Director of the United States Patent and Trademark Office*